(12) United States Patent
Usvyatsky et al.

(10) Patent No.: US 10,614,036 B1
(45) Date of Patent: Apr. 7, 2020

(54) TECHNIQUES FOR DE-DUPLICATING DATA STORAGE SYSTEMS USING A SEGMENTED INDEX

(71) Applicant: EMC IP Holding Company LLC, Hopkinton, MA (US)

(72) Inventors: Ilya Usvyatsky, Northborough, MA (US); Nickolay Alexandrovich Dalmatov, Saint Petersburg (RU)

(73) Assignee: AMC IP Holding Company LLC, Hopkinton, MA (US)

( * ) Notice: Subject to any disclaimer, the term of this patent is extended or adjusted under 35 U.S.C. 154(b) by 494 days.

(21) Appl. No.: 15/394,376

(22) Filed: Dec. 29, 2016

(51) Int. Cl.
  *G06F 16/00* (2019.01)
  *G06F 16/174* (2019.01)
  *G06F 11/14* (2006.01)
  *G06F 16/13* (2019.01)
  *G06F 16/14* (2019.01)

(52) U.S. Cl.
  CPC ...... *G06F 16/1748* (2019.01); *G06F 11/1453* (2013.01); *G06F 11/1464* (2013.01); *G06F 16/137* (2019.01); *G06F 16/152* (2019.01); *G06F 2201/80* (2013.01)

(58) Field of Classification Search
  CPC ............ G06F 2101/02; G06F 2101/04; G06F 2101/06; G06F 2101/08; G06F 2101/10; G06F 2101/12; G06F 2101/14; G06F 2207/00; G06F 2212/00; G06F 16/1748
  See application file for complete search history.

(56) References Cited

U.S. PATENT DOCUMENTS

| | | | |
|---|---|---|---|
| 8,370,315 B1 * | 2/2013 | Efstathopoulos ... | G06F 16/2228 707/696 |
| 8,498,995 B1 | 7/2013 | Gond et al. | |
| 8,499,355 B1 | 7/2013 | Goncharov | |
| 8,752,148 B1 | 6/2014 | Vipond et al. | |
| 8,799,601 B1 | 8/2014 | Chen et al. | |
| 8,880,484 B1 * | 11/2014 | Chamness ............ | G06F 3/0619 382/232 |
| 8,977,660 B1 | 3/2015 | Xin et al. | |
| 9,432,339 B1 | 8/2016 | Bowness | |
| 9,778,881 B2 | 10/2017 | Romanovskiy | |

(Continued)

OTHER PUBLICATIONS

Dalmatov; "Backup Server Selection Based on Data Commonality," U.S. Appl. No. 15/321,500, filed Dec. 22, 2016.

(Continued)

*Primary Examiner* — Augustine K. Obisesan
(74) *Attorney, Agent, or Firm* — BainwoodHuang (57) ABSTRACT

Techniques have been provided for storing data in a de-duplicated manner on a data storage system in a manner that allows for real-time reference to an index that is too large to fit within memory. This may be accomplished by segmenting the index into smaller segments, stored on disk. Only a subset of the segments may be loaded into memory at a given time. A predictive filter is stored in memory for each segment, allowing a de-duplication driver to quickly predict whether any given new block is likely to be indexed by each segment. Since identical blocks are often stored in long identical sequences (e.g., upon copying a disk image to a disk for a virtual machine), once a segment stored on disk is referenced many times in a short period, it is loaded into memory to allow the remainder of the long sequence to be de-duplicated.

17 Claims, 2 Drawing Sheets

(56) References Cited

U.S. PATENT DOCUMENTS

| | | | |
|---|---|---|---|
| 2011/0093664 A1* | 4/2011 | Leppard | G06F 3/061 711/154 |
| 2013/0086006 A1* | 4/2013 | Colgrove | G06F 3/0608 707/692 |
| 2013/0173627 A1* | 7/2013 | Apte | G06F 16/1748 707/741 |
| 2015/0363308 A1* | 12/2015 | Park | G06F 12/0246 711/103 |
| 2015/0370495 A1* | 12/2015 | Georgiev | G06F 16/1748 711/114 |

OTHER PUBLICATIONS

Hu et al.; "Performing Block Deduplication Using Block Sequence Classifications," U.S. Appl. No. 14/671,017, filed Mar. 27, 2015.
Armangau, et al.; "Inline Deduplication of Compressed Data," U.S. Appl. No. 14/980,944, filed Dec. 28, 2015.

* cited by examiner

Fig. 1

TECHNIQUES FOR DE-DUPLICATING DATA STORAGE SYSTEMS USING A SEGMENTED INDEX

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines, which specify files or other data elements to be written, read, created, deleted, etc. Software running on the storage processors manages incoming storage requests and performs various data processing tasks to organize and secure the data elements stored on the non-volatile storage devices. Filesystems are generally built upon volumes. In some data storage systems, slices of data storage may be provisioned to a volume that supports a filesystem on an as-needed basis. As is known, slices are uniformly-sized storage extents, which may be 256 megabytes (MB) or 1 gigabyte (GB), for example. When a filesystem requires additional storage space to accommodate incoming writes, a data storage system may provide the additional space by provisioning another slice to the volume that backs the filesystem. The filesystem subdivides these slices into data blocks which may be 4 kilobytes or 8 kilobytes, for example.

Some data storage systems employ a de-duplication feature so that identical blocks of data on two different volumes need not be physically stored on disk in two different locations. Rather, one volume includes a pointer to the location on disk where the other volume has stored the same data block.

SUMMARY

Unfortunately, the above-mentioned systems suffer some deficiencies. For example, in order to keep track of which blocks have already been stored in a manner that allows incoming blocks to be easily compared for de-duplication, an index may be used. However, data storage systems with large amounts of data subject to de-duplication, the index can easily exceed the memory limitations of the data storage system. Thus, it is not possible to keep the entire index in memory at once. It may be possible to search the index on disk, but this is too slow for real-time de-duplication of data upon ingest.

Thus, it would be desirable to implement de-duplication that allows for real-time reference to an index that is too large to fit within memory. This may be accomplished by segmenting the index into smaller segments, stored on disk. Only a subset of the segments may be loaded into memory at a given time. A predictive filter is stored in memory for each segment, allowing the de-duplication driver to quickly predict whether any given block is likely to be indexed by each segment. Since identical blocks are often stored in long identical sequences (e.g., upon copying a disk image to a disk for a virtual machine), once a segment stored on disk is referenced many times in a short period, it is loaded into memory to allow the remainder of the long sequence to be de-duplicated. In some embodiments, a Bloom filter is used.

One embodiment is directed to a method of storing data in a de-duplicated manner on a data storage system. The method includes (a) receiving a block of data to be stored to a logical address of the data storage system, (b) filtering the block of data against each of a plurality of predictive filters to predict whether the block of data is likely to be indexed on each respective segment of a plurality of segments of a de-duplication index, the plurality of segments being partitioned into a first set of segments stored within system memory of the data storage system and a second set of segments not stored within system memory of the data storage system, (c) in response to determining that the block of data is predicted to likely be indexed by each of a subset of the segments stored within system memory, checking whether the block of data is actually indexed by any of the segments of the subset, and (d) in response to determining that the block of data is actually indexed by a particular segment of the subset of the segments stored within system memory, the particular segment indicating a location on the data storage system where the data block was previously stored, (1) causing the logical address of the data storage system to point to the indicated location on the data storage system where the data block was previously store and (2) refraining from writing the received block of data to the logical address of the data storage system. Other embodiments are directed to corresponding apparatuses, computer program products, and systems for performing similar methods.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views. In the accompanying drawings.

DETAILED DESCRIPTION

Embodiments of the invention will now be described. It is understood that such embodiments are provided by way of example to illustrate various features and principles of the invention, and that the invention hereof is broader than the specific example embodiments disclosed.

Embodiments are directed to storing data in a de-duplicated manner on a data storage system in a manner that allows for real-time reference to an index that is too large to fit within memory. This may be accomplished by segmenting the index into smaller segments, stored on disk. Only a subset of the segments may be loaded into memory at a given time. A predictive filter is stored in memory for each segment, allowing the de-duplication driver to quickly predict whether any given block is likely to be indexed by each segment. Since identical blocks are often stored in long identical sequences (e.g., upon copying a disk image to a disk for a virtual machine), once a segment stored on disk is referenced many times in a short period, it is loaded into memory to allow the remainder of the long sequence to be de-duplicated. In some embodiments, a Bloom filter is used.

Figure 1:
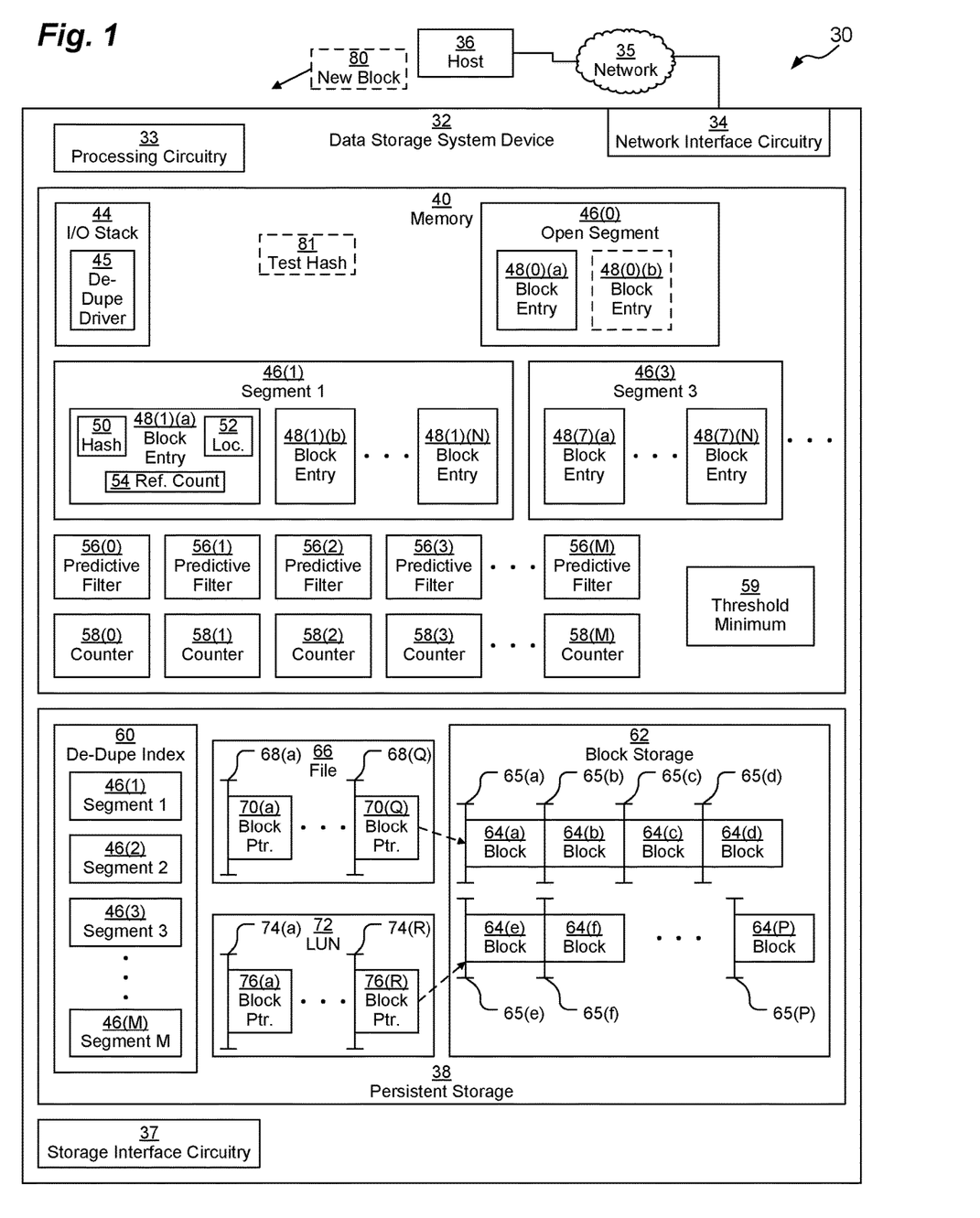
FIG. 1 is a block diagram depicting an example system and apparatus for use in connection with various embodiments.

FIG. 1 shows an example environment 30 in which embodiments of the improved techniques hereof can be practiced. Here, one or more host computing devices 36 access a data storage system (DSS) device 32 over a network 35. The data storage system 32 includes processing circuitry 33, network interface circuitry 34, memory 40, storage interface circuitry 37, and a set of storage drives (not depicted) that provide persistent storage 38. DSS device 32 may also include other components, such as, for example, a chassis and interconnection circuitry.

In an example, the storage drives of persistent storage 38 may be arranged into one or more RAID groups (not depicted) where each RAID group is composed of multiple storage drives. The storage drives may include magnetic disk drives, electronic flash drives, optical drives, and/or other types of persistent storage.

The network 35 may be any type of network or combination of networks, such as a storage area network (SAN), a local area network (LAN), a wide area network (WAN), the Internet, and/or some other type of network or combination of networks, for example. The hosts 36 may connect to the DSS device 32 using various technologies, such as Fibre Channel, iSCSI, NFS, SMB 3.0, and CIFS, for example. Any number of hosts 36 may be provided, using any of the above protocols, some subset thereof, or other protocols besides those shown. The DSS device 32 is configured to receive I/O (input/output) requests (not depicted) according to standardized protocols and to respond to such I/O requests by reading or writing to the persistent storage 38 and providing an I/O response (not depicted) back to the initiating host 36.

Network interface circuitry 34 is configured to connect to network 35. Network interface circuitry 34 may include, for example, a SCSI target adapter or network interface adapters for converting electronic and/or optical signals received over the network 35 to electronic form for use by processing circuitry 33.

Processing circuitry 33 may be any kind of processor or set of processors configured to perform operations, such as, for example, one or more microprocessors, multi-core microprocessors, digital signal processors, systems on a chip, collections of electronic circuits, similar kinds of controllers, or any combination of the above.

The storage interface circuitry 37 may include, for example, SCSI adapters and other disk interface adapters (e.g., SAS, ATA, SATA, Fibre Channel, etc.) for communicating between the persistent storage 38 and the processing circuitry 33 or memory 40.

The DSS device 32 may include multiple storage processors (not depicted). Each storage processor may include its own instance of the processing circuitry 33, network interface circuitry 34, storage interface circuitry 37, and memory 40. Multiple storage processors may be provided as circuit board assemblies, or "blades," which plug into a chassis, which encloses and cools the storage processors. The chassis has a backplane for interconnecting the storage processors, and additional connections may be made among storage processors using cables. It is understood, however, that no particular hardware configuration is required, as any number of storage processors, including a single storage processor, may be provided and the storage processor can be any type of computing device capable of processing host I/Os.

Memory 40 may be any kind of digital system memory, such as, for example, random access memory (RAM). Memory 40 stores one or more operating systems (not depicted) in operation (e.g., Linux, UNIX, Windows, MacOS, or a similar operating system), an I/O driver stack 44 (which includes a de-duplication driver 45) executing on processing circuitry 33 and various associated data structures. Memory 40 may also store various other applications (not depicted) executing on processing circuitry 33.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 38 is configured to store programs and data even while the DSS device 32 is powered off. The operating system and the applications and drivers are typically stored in this persistent storage portion of memory 40 or in persistent storage 38 so that they may be loaded into a system portion of memory 40 from this persistent storage portion of memory 40 or persistent storage 38 upon a system restart. These applications and drivers, when stored in non-transient form either in the volatile portion of memory 40 or in persistent storage 38 or in persistent portion of memory 40, form a computer program product. The processing circuitry 33 running one or more of these applications or drivers thus forms a specialized circuit constructed and arranged to carry out the various processes described herein.

Persistent storage 38 is arranged to include block storage 62 for storing data blocks 64 (depicted as data blocks 64(a), 64(b), 64(c), 64(d), 64(e), 64(f), . . . , 64(P)) that back one or more logical disks (LUNs) 72 or filesystems (not depicted) that rest thereupon. Persistent storage 38 also stores at least one LUN 72, at least one file 66 (which may include file metadata as well as a set of pointers 70, whether in an inode or indirect blocks of the file 66), and a de-duplication index 60. Each provisioned address 74 of LUN 72 is backed by a block 64 from block storage 62. Thus, for example, as depicted in FIG. 1, block pointer 76(R) at logical address 74(R) of LUN 72 is backed by block 64(e).

De-duplication index 60 includes a plurality of segments 56 (depicted as segments 46(1), 46(2), 46(3), . . . , 46(M)). Each segment 46 stores indexing information for various blocks 64 in block storage 62.

Memory 40 also stores some (but not all) of the segments 46 from persistent storage 38. As depicted, memory 40 store segments 46(1), 46(3), etc., but not segment 46(2). Memory 40 also stores an open segment 40(0), a set of predictive filters 56 (depicted as predictive filters 56(0), 56(1), 56(2), 56(3), . . . , 56(M))—one for each segment 46 in de-duplication index 60 as well as the open segment 46(0)—, a set of counters 58 (depicted as counters 58(0), 58(1), 58(2), 58(3), . . . , 58(M))—one for each segment 46 in de-duplication index 60 as well as the open segment 46(0)—, and a threshold minimum 59.

Each segment 46 includes a set of block entries 48. A typical segment 46(X) (except for the open segment 46(0)) includes exactly N block entries 48(X)(1)-48(X)(N). In one embodiment, each block entry 48 is sixty-four bytes long, and each segment 46 is sixty-four megabytes long, so N is 1,048,576. In other embodiments, other sizes for block entries 48 and segments 46 may be used (e.g., in some embodiments, the size of a segment 46 may be sixty-four megabytes, 128 megabytes, 256 megabytes, or 512 megabytes).

In some embodiments, as depicted in the context of block entry 48(1)(a) in FIG. 1, each block entry 48 includes a hash 50, a location pointer 52, and a reference count 54. Each block entry 48 corresponds uniquely to a given block 64 as stored on persistent storage 38. A hash 50 is used to uniquely identify a block 64 within block storage 62. A pre-determined hashing function (not depicted) is used to generate each hash 50. In one embodiment, each hash 50 may be eighteen bytes in length, which is virtually guaranteed to avoid having the same hash 50 for two different blocks 64. For example, if block storage 62 can store 15 petabytes of unique data blocks 64, and each block 64 is 8 kilobytes long, then the chance of a hash collision with an 18-byte hash 50 is on the order of 1 in $10^{30}$.

Location pointer 52 points to an address 65 within block storage 38 where the block 64 hashed by hash 50 is stored. In one embodiment, location pointer 52 is six bytes long. Each block 64(Y) within block storage 62 has a unique address 65(Y) so that it can be located precisely. Reference count 54 is used to count how many logical addresses 68, 74 on LUNs 72 or files 66 point to the block 64(Y) at address 65(Y) pointed to by location pointer 52.

Open segment 46(0) contains block entries 48(0) (e.g., 48(0)(a)) that have recently been added. Open segment 46(0) always contains fewer than N block entries 48(0). Once the Nth block entry 48(0)(N) is added to open segment 46(0), open segment 46(0) closes and is flushed to disk, becoming a closed segment 46 that is part of de-duplication index 60, at which point a new open segment 46(0) is started.

During operation, when a new data block 80 comes in as part of a write command, as the write command passes down the I/O driver stack 44, de-duplication driver 45 intercepts the write command and performs de-duplication. De-duplication driver 45 hashes the new block 80 to yield test hash 81 and checks whether or not that test hash 81 is likely to be included within any of the block entries 48 of any segment 46. It does this by applying each predictive filter 56 to test hash 81 in turn. If test hash 81 is likely to appear within segment 46(X), then when predictive filter 56(X) is applied to test hash 81, it will yield an affirmative result. In one embodiment, each predictive filter 56 is a Bloom filter, as is well-known in the art, so when predictive filter 56(X) is applied to test hash 81, a negative result means that test hash 81 definitively does not appear within segment 46(X), but an affirmative result means that test hash 81 may or may not appear within segment 46(X). If the test hash 81 does not already appear in any segment 46 stored within memory 40, then de-duplication driver 45 causes block 80 to be written to a previously unused block 64(Y) within block storage 62 and it adds a new entry 48 (e.g., block entry 48(0)(b)) to open segment that points to that block 64(Y). Otherwise de-duplication driver 45 causes the write command to complete by updating a block pointer 68, 74 to point to a block 64(Y) in block storage 62 that already stored identical data to new block 80 as identified by a block entry 48 from a segment 46 stored within memory 40.

Every time a test hash 81 is applied against a predictive filter 56(X), the associated counter 58(X) is updated based on whether the application resulted in an affirmative or negative result. For example, in one embodiment, de-duplication driver 45 decrements counter 58(X) for every negative result and increments it for every affirmative result. Segments 46(X) having the highest-valued respective counters 58(X) are stored within memory 40, while segments 46(X) having lower-valued respective counters 58(X) are not stored within memory 40, but only within persistent storage 38. In one embodiment, memory 40 stores the one hundred segments 46(X) having the highest respective counters 58(X).

In some embodiments, if a counter 58(X) drops below a threshold minimum value 59, then the data blocks 64 it indexes may be considered so unpopular that they are unlikely to ever be needed again for de-duplication purposes. Thus, the respective segments 46(X) and predictive filters 56(X) for those very low-valued counters 58(X) may be entirely deleted from both memory 40 and persistent storage 38.

Figure 2:
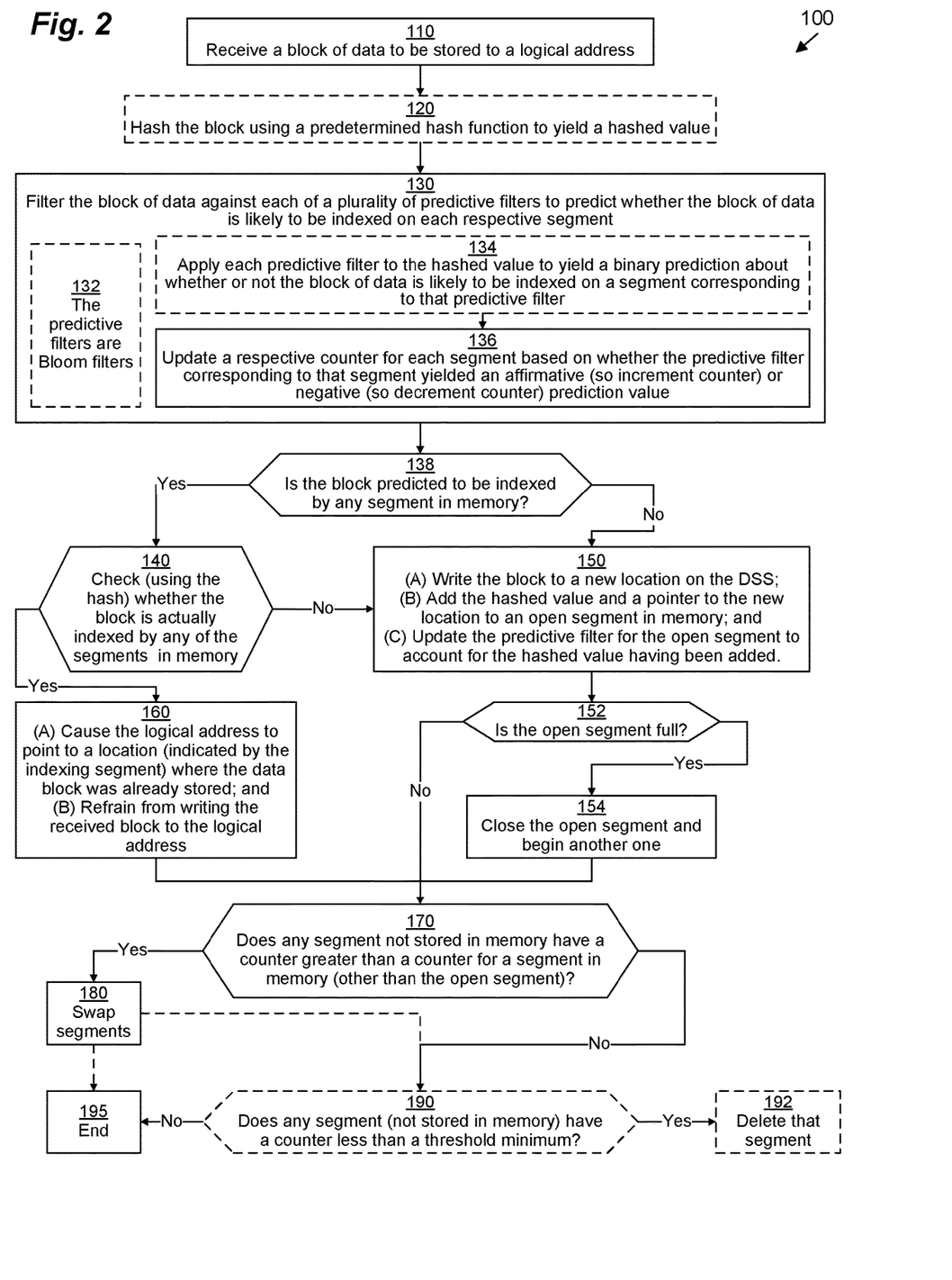
FIG. 2 is a flowchart depicting example methods of various embodiments.

FIG. 2 illustrates an example method 100 performed by de-duplication driver 45 of driver stack 44 for storing data in a de-duplicated manner on DSS device 32 in a manner that allows for real-time reference to an index 60 that is too large to fit within memory 40. It should be understood that any time a piece of software (e.g., I/O stack 44, de-duplication driver 45, etc.) is described as performing a method, process, step, or function, in actuality what is meant is that a computing device (e.g., DSS device 32) on which that piece of software is running performs the method, process, step, or function when executing that piece of software on its processing circuitry 33.

It should be understood that, within FIG. 2, certain steps and sub-steps are drawn with a dashed border because they may be considered optional, depending on the embodiment, or they may represent various alternative scenarios in which method 100 may be employed. In addition, one or more of the other steps or sub-steps of method 100 may also be omitted in some embodiments. Similarly, in some embodiments, one or more steps or sub-steps may be combined together or performed in a different order. Method 100 is performed by DSS device 32. More specifically, method 100 is performed by de-duplication driver 45 running on DSS device 32 in combination with other components of DSS device 32.

In step 110, de-duplication driver 45 receives a new data block 80 to be stored to a logical address 68, 74 on DSS device 32.

In some embodiments, de-duplication driver 45 then performs optional step 120. In step 120, de-duplication driver 45 hashes the new block 80 using a predetermined hashing function to yield test hash value 81.

In step 130, de-duplication driver 45 filters the new block 80 against each of a plurality of predictive filters 56 to predict whether the new block 80 is likely to be indexed on each respective segment 46. In some embodiments, sub-step 132 indicates that the predictive filters 56 are Bloom filters.

In embodiments in which step 120 was performed, step 130 may be performed by performing sub-step 134. In sub-step 134, de-duplication driver 45 applies each of the plurality of predictive filters 56 to test hash 81 to yield a set of binary predictions about whether the new block 80 is likely to be indexed on each respective segment 46.

Step 130 also includes sub-step 136. In sub-step 136, de-duplication driver 45 updates a respective counter 58 for each segment 46 based on whether the predictive filter 56 corresponding to that segment 46 yielded an affirmative or negative prediction value. In one embodiment, when predictive filter 56(X) yields an affirmative prediction value upon application to test hash 81, de-duplication driver 45 increments the value of counter 58(X), and when predictive filter 56(X) yields a negative prediction value upon application to test hash 81, de-duplication driver 45 decrements the value of counter 58(X).

Then, in step 138, de-duplication driver 45 determines whether or not predictive filters 56 for any segments 46 stored within memory 40 yielded an affirmative result. If so, operation proceeds with step 140. Otherwise, operation proceeds with step 150.

In step 140, since at least one segment 46 stored within memory 40 has been predicted to index the new block 80, de-duplication driver 45 checks the segments 46 stored within memory 40 which were predicted to index the new block 80 to see if any particular segment 46(X) actually includes test hash 81 as a hash 50 within any of its block entries 48(X)(a-N). However, since the predictive filters 56 are only probabilistic, it is possible that some of the predictions were affirmative even though none of the segments 46 stored within memory 40 actually store test hash 81. In some embodiments, de-duplication driver 45 checks the segments 46 within memory 40 having the affirmative results sequentially only until a particular segment 46(X) is found which actually includes test hash 81 as a hash 50 within any of its block entries 48(X)(a-N). If a particular segment 46(X) is found satisfying this condition, then operation proceeds with step 160. Otherwise, operation proceeds with step 150.

In step 160, since a particular segment 46(X) within memory 40 already indexes the new block 80, de-duplication driver 45 is able to arrange it such that driver stack 46 refrains from writing the new block 80 to any block 64 on persistent storage 38. Rather, de-duplication driver 45 causes a pointer 70, 76 at the logical address 68, 74 to which the new block 80 was supposed to be stored to point to (or be backed by) a block 64(Y) pointed to by location pointer 52 of a block entry 48(X)(Z) within the particular segment 46(X) for which the hash 50 is the same as test hash 81.

Alternatively, in step 150, since no particular segment 46(X) within memory 40 already indexes the new block 80, de-duplication driver 45 (A) writes the new block 80 to a new address 65(Y) on the block storage 62 as block 64(Y), (B) creates a new block entry 48(0)(b) on open segment 46(0) with the test hash 81 as its hash 50 and a pointer to the new address 65(Y) as its location pointer 52, and (C) updates the predictive filter 56(0) for the open segment 46(0) to account for the new block entry 48(0)(b) with its hash 50. Reference count 54 for new block entry 48(0)(b) may be initialized to a value of one.

Since a new block entry 48(0)(b) was added to the open segment 46(0) in step 150, operation proceeds with step 152 in which de-duplication driver 45 determines whether open segment 46(0) is now full (i.e., if it now contains N block entries 48(0)(a-N). If so, operation proceeds with step 154. Otherwise, operation proceeds with step 170. In step 154, de-duplication driver 45 closes the open segment 46(0), causing it to be stored to persistent storage 38 as part of the de-duplication index 40 (although it also may remain cached in memory 40). De-duplication driver 45 may also start a new open segment 46(0).

Operation proceeds with step 170 after steps 154 and 160 (and upon a negative result in step 152). In step 170, de-duplication driver 45 determines whether or not any segment 46(S) that is not stored within memory 40 has a respective counter 58(S) with a larger value than any counter 58(T) of a segment 46(T) within memory 40 (excluding the open segment 46(0) which may not be swapped out of memory 40 as long as it remains open). If so, operation proceeds with step 180. Otherwise, in some embodiments, operation proceeds with optional step 190, while, in other embodiments, operation may proceed with step 195, in which method 100 terminates.

In step 180, de-duplication driver 45 swaps segment 46(S) into memory 40 while segment 46(T) having a smaller-valued counter 58(T) is swapped out of memory 40 so that it is now only stored on persistent storage 38 rather than also being stored within memory 40. Then, in some embodiments, operation proceeds with optional step 190, while, in other embodiments, operation may proceed with step 195, in which method 100 terminates.

In optional step 190, in some embodiments, de-duplication driver 45 determines whether or not any segment 46(X) has a respective counter 58(X) with a value less than the threshold minimum value 59. De-duplication driver 45 may limit step 190 to only examining the counters 58 for segments 46 that are not stored within memory 40. If such a segment 46(X) with a small-valued counter 58(X) is found, operation proceeds with step 192, in which de-duplication driver 45 deletes that segment 46(X) from persistent storage 38 and then terminates method 100. Otherwise, operation may anyway proceed with step 195, in which method 100 terminates.

Thus, techniques have been provided for storing data in a de-duplicated manner on a DSS device 32 in a manner that allows for real-time reference to an index 60 that is too large to fit within memory 40. This may be accomplished by segmenting the index 60 into smaller segments 46, stored on persistent storage 38. Only a subset (e.g., one hundred out of perhaps one million) of the segments 46 may be loaded into memory 40 at a given time. A predictive filter 56 is stored in memory 40 for each segment 46, allowing the de-duplication driver 45 to quickly predict whether any given new block 80 is likely to be indexed by each segment 46. Since identical blocks 64 are often stored in long identical sequences (e.g., upon copying a disk image to a disk for a virtual machine), once a segment 46 stored on persistent storage 38 is referenced many times in a short period, it is loaded into memory 40 to allow the remainder of the long sequence to be de-duplicated. In some embodiments, a Bloom filter is used.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

It should be understood that all embodiments which have been described may be combined in all possible combinations with each other, except to the extent that such combinations have been explicitly excluded.

Finally, even if a technique, method, apparatus, or other concept is specifically labeled as "background" or "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of storing data in a de-duplicated manner on a data storage system, the method comprising:
receiving a block of data to be stored to a logical address of the data storage system;
filtering the block of data against each of a plurality of predictive filters to predict whether the block of data is likely to be indexed on each respective segment of a plurality of segments of a de-duplication index, the plurality of segments being partitioned into a first set of segments stored within system memory of the data storage system and a second set of segments not stored within system memory of the data storage system, each of the plurality of predictive filters, including the predictive filters corresponding to the segments of the second set, being stored within system memory, wherein filtering includes reading the plurality of predictive filters from system memory;
in response to determining that the block of data is predicted to likely be indexed by each of a subset of the segments stored within system memory, checking whether the block of data is actually indexed by any of the segments of the subset; and
in response to determining that the block of data is actually indexed by a particular segment of the subset of the segments stored within system memory, the particular segment indicating a location on the data storage system where the data block was previously stored:
    causing the logical address of the data storage system to point to the indicated location on the data storage system where the data block was previously stored; and
    refraining from writing the received block of data to the logical address of the data storage system,
wherein filtering the block of data against each of the plurality of predictive filters includes updating a respective counter for each segment based on a prediction result of the predictive filter corresponding to that segment, and
wherein the method further comprises swapping a set of the segments out of system memory based at least in part on the respective counters of the set of the segments.

2. The method of claim 1 wherein filtering the block of data against each of the plurality of predictive filters further includes:
hashing the block of data using a predetermined hash function to yield a hashed value; and
applying each predictive filter to the hashed value to yield a binary prediction about whether or not the block of data is likely to be indexed on a segment corresponding to that predictive filter.

3. The method of claim 2 wherein:
filtering the block of data against each of the plurality of predictive filters further includes updating the respective counter for each segment based on whether the predictive filter corresponding to that segment yielded an affirmative or negative prediction value; and
the method further comprises:
    comparing the respective counters for each segment of the plurality of segments;
    swapping a first segment from the second set of segments into system memory; and
    swapping a second segment from the first set of segments out of system memory, the second segment having a smaller counter than the first segment.

4. The method of claim 3 wherein updating the respective counter for each segment based on whether the predictive filter corresponding to that segment yielded an affirmative or negative prediction value includes:
incrementing the respective counter for segments whose predictive filter yielded an affirmative prediction value; and
decrementing the respective counter for segments whose predictive filter yielded a negative prediction value.

5. The method of claim 3 wherein the method further comprises:
comparing the respective counters for each segment of the plurality of segments to a threshold minimum; and
in response to determining that a counter for a third segment has a value smaller than the threshold minimum, deleting the third segment from the data storage system.

6. The method of claim 2 wherein each predictive filter is a Bloom filter.

7. The method of claim 2 wherein the method further comprises:
receiving another block of data to be stored to another logical address of the data storage system;
hashing the other block of data using the predetermined hash function to yield another hashed value;
applying each predictive filter to the other hashed value to yield another binary prediction about whether or not the other block of data is likely to be indexed on each segment corresponding to that predictive filter; and
in response to determining that the other block of data is not predicted to be indexed by any segment of the first set of segments stored within system memory:
    writing the other block of data to a new location on the data storage system;
    adding the other hashed value and a pointer to the new location to an open segment of the first set of segments stored within system memory; and
    updating the predictive filter for the open segment to account for the other hashed value having been added.

8. The method of claim 7 wherein the method further comprises:
in response to adding the other hashed value and the pointer to the new location to the open segment, determining that the open segment has become full;
in response to determining that the open segment has become full, closing the open segment and creating a new open segment as part of the de-duplication index within the first set stored within system memory.

9. The method of claim 2 wherein the method further comprises:
receiving another block of data to be stored to another logical address of the data storage system;
hashing the other block of data using the predetermined hash function to yield another hashed value;
applying each predictive filter to the other hashed value to yield another binary prediction about whether or not the other block of data is likely to be indexed on each segment corresponding to that predictive filter;
in response to determining that the other block of data is predicted to likely be indexed by each of a subset of the segments stored within system memory, checking whether the other block of data is actually indexed by any of the segments of the subset;
in response to determining that the block of data is not actually indexed by any segment of the subset of the segments stored within system memory:
    writing the other block of data to a new location on the data storage system;
    adding the other hashed value and a pointer to the new location to an open segment of the first set of segments stored within system memory; and
    updating the predictive filter for the open segment to account for the other hashed value having been added.

10. The method of claim 9 wherein the method further comprises:
in response to adding the other hashed value and the pointer to the new location to the open segment, determining that the open segment has become full;

in response to determining that the open segment has become full, closing the open segment and creating a new open segment as part of the de-duplication index within the first set stored within system memory.

11. The method of claim 1 wherein receiving, filtering, determining that the block of data is predicted to likely be indexed by each of the subset of the segments stored within system memory, and checking are performed without reading from persistent storage of the data storage system.

12. An apparatus comprising:
persistent storage devices providing data storage;
network interface circuitry configured to communicate with a host over a network; and
processing circuitry coupled to memory to form a control circuit configured to store data in a de-duplicated manner in data storage by:
receiving a block of data to be stored to a logical address;
filtering the block of data against each of a plurality of predictive filters to predict whether the block of data is likely to be indexed on each respective segment of a plurality of segments of a de-duplication index, the plurality of segments being partitioned into a first set of segments stored within system memory of the apparatus and a second set of segments not stored within system memory of the apparatus, each of the plurality of predictive filters, including the predictive filters corresponding to the segments of the second set, being stored within system memory, wherein filtering includes reading the plurality of predictive filters from system memory;
in response to determining that the block of data is predicted to likely be indexed by each of a subset of the segments stored within system memory, checking whether the block of data is actually indexed by any of the segments of the subset; and
in response to determining that the block of data is actually indexed by a particular segment of the subset of the segments stored within system memory, the particular segment indicating a location of the data storage where the data block was previously stored:
causing the logical address to point to the indicated location of the data storage where the data block was previously stored; and
refraining from writing the received block of data to the logical address,
wherein filtering the block of data against each of the plurality of predictive filters includes updating a respective counter for each segment based on a prediction result of the predictive filter corresponding to that segment, and
wherein the processing circuitry coupled to memory is further configured to swap a set of the segments out of system memory based at least in part on the respective counters of the set of the segments.

13. The apparatus of claim 12 wherein filtering the block of data against each of the plurality of predictive filters further includes:
hashing the block of data using a predetermined hash function to yield a hashed value; and
applying each predictive filter to the hashed value to yield a binary prediction about whether or not the block of data is likely to be indexed on a segment corresponding to that predictive filter.

14. The apparatus of claim 13 wherein:
filtering the block of data against each of the plurality of predictive filters further includes updating the respective counter for each segment based on whether the predictive filter corresponding to that segment yielded an affirmative or negative prediction value; and
the processing circuitry coupled to memory is further configured to:
compare the respective counters for each segment of the plurality of segments;
swap a first segment from the second set of segments into system memory of the apparatus; and
swap a second segment from the first set of segments out of system memory of the apparatus, the second segment having a smaller counter than the first segment.

15. A computer program product comprising a non-transitory computer-readable storage medium storing a set of instructions, which, when executed by control circuitry of a data storage system, cause the control circuitry to store data in a de-duplicated manner in the data storage system by:
receiving a block of data to be stored to a logical address on the data storage system;
filtering the block of data against each of a plurality of predictive filters to predict whether the block of data is likely to be indexed on each respective segment of a plurality of segments of a de-duplication index, the plurality of segments being partitioned into a first set of segments stored within system memory of the data storage system and a second set of segments not stored within system memory of the data storage system, each of the plurality of predictive filters, including the predictive filters corresponding to the segments of the second set, being stored within system memory, wherein filtering includes reading the plurality of predictive filters from system memory;
in response to determining that the block of data is predicted to likely be indexed by each of a subset of the segments stored within system memory, checking whether the block of data is actually indexed by any of the segments of the subset; and
in response to determining that the block of data is actually indexed by a particular segment of the subset of the segments stored within system memory, the particular segment indicating a location on the data storage system where the data block was previously stored:
causing the logical address on the data storage system to point to the indicated location on the data storage system where the data block was previously stored; and
refraining from writing the received block of data to the logical address on the data storage system,
wherein filtering the block of data against each of the plurality of predictive filters includes updating a respective counter for each segment based on a prediction result of the predictive filter corresponding to that segment, and
wherein the set of instructions, when executed by the control circuitry of the data storage system, further cause the control circuitry to swap a set of the segments out of system memory based at least in part on the respective counters of the set of the segments.

16. The computer program product of claim 15 wherein filtering the block of data against each of the plurality of predictive filters further includes:
hashing the block of data using a predetermined hash function to yield a hashed value; and applying each predictive filter to the hashed value to yield a binary prediction about whether or not the block of data is likely to be indexed on a segment corresponding to that predictive filter.

17. The computer program product of claim 16 wherein:

filtering the block of data against each of the plurality of predictive filters further includes updating the respective counter for each segment based on whether the predictive filter corresponding to that segment yielded an affirmative or negative prediction value; and the set of instructions, when executed by the control circuitry of the data storage system, further cause the control circuitry to:
- compare the respective counters for each segment of the plurality of segments;
- swap a first segment from the second set of segments into system memory of the data storage system; and
- swap a second segment from the first set of segments out of system memory of the data storage system, the second segment having a smaller counter than the first segment.

\* \* \* \* \*

UNITED STATES PATENT AND TRADEMARK OFFICE
CERTIFICATE OF CORRECTION

PATENT NO.           : 10,614,036 B1
APPLICATION NO.      : 15/394376
DATED                : April 7, 2020
INVENTOR(S)          : Usvyatsky et al.

Page 1 of 1

It is certified that error appears in the above-identified patent and that said Letters Patent is hereby corrected as shown below:

On the Title Page (73) Assignee should read:
EMC IP Holding Company LLC

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*